United States Patent Office 3,652,673
Patented Mar. 28, 1972

3,652,673
1,2-DI[4-(2-AMINOETHYL)PHENYL]-3-
AMINOPROPANE
William J. Farrissey, Jr., Northford, and Edward J.
Thompson, Watertown, Conn., assignors to The Upjohn
Company, Kalamazoo, Mich.
No Drawing. Original application Jan. 15, 1968, Ser. No.
697,652, now Patent No. 3,539,611, dated Nov. 10,
1970. Divided and this application May 8, 1970, Ser.
No. 35,920
Int. Cl. C07c 87/28
U.S. Cl. 260—570.5 P          1 Claim

ABSTRACT OF THE DISCLOSURE

A triisocyanate, 1,2-di[4-(2-isocyanatoethyl)phenyl]-3-isocyanatopropane, is prepared by phosgenation of the corresponding triamine. The latter is prepared by catalytic hydrogenation of the corresponding trinitrile. The latter is obtained by reaction of $\alpha,\alpha'$-dihalo-p-xylene with sodium cyanide. The triisocyanate is an intermediate in the preparation of polyurethanes; the triamine is a curative for epoxy resins and the like.

CROSS-REFERENCE TO RELATED APPLICATION

This application is a division of copending application Ser. No. 697,652, filed Jan. 15, 1968 and now U.S. Pat. No. 3,539,611.

BACKGROUND OF THE INVENTION (1) Field of the invention

This invention relates to a novel triisocyanate, namely, 1,2 - di[4 - (2 - isocyanatoethyl)phenyl]-3-isocyanatopropane and to processes for its preparation from the corresponding triamine, and to processes for the preparation of the latter from the corresponding trinitrile, and to the said intermediate trinitrile and triamine.

(2) Description of the prior art

Diisocyanates in which the isocyanato groups are linked by an alkylene chain to an aromatic nucleus are well-known in the art to be useful in the preparation of age resistant, color stable polyurethanes; see, for example, Canadian Pat. 675,618, and French Pat. 1,439,697. This invention provides, for the first time, a triisocyanate which exhibits the same structural features as said diisocyanates and hence can be used in the preparation of polyurethanes which possess the desirable properties of age resistance and color stability.

BRIEF DESCRIPTION OF THE INVENTION

The invention comprises the novel compound 1,2-di[4-(2 - isocyanatoethyl)phenyl]-3-isocyanatopropane which has the formula:

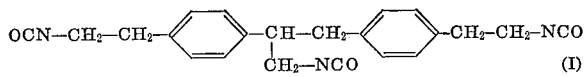
(I)

The invention also comprises the corresponding novel triamine, namely, 1,2 - di[4 - (2-aminoethyl)phenyl]-3-aminopropane having the formula:

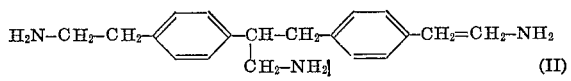
(II)

which, as set forth hereinafter, is the intermediate from which the triisocyanate (I) is prepared by phosgenation. As will be appreciated by one skilled in the art, the triamine (II) can exist in the form of the free amine and also in the form of acid addition salts. Both forms are within the scope of the invention.

The invention also comprises the corresponding novel trinitrile, namely, 1,2-di(4-cyanomethylphenyl)-1-cyanoethane, having the formula:

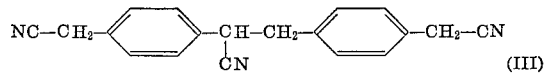
(III)

which, as set forth hereinafter, is the intermediate from which the triamine (II) is prepared by hydrogenation.

The triisocyanate (I) is useful as an intermediate in the preparation of polyurethanes, both cellular and non-cellular, in accordance with procedures well known in the art for the preparation of polyurethanes from polyisocyanates; see, for example, Saunders et al. Polyurethanes, Chemistry and Technology, Part II, Interscience, New York, 1964. The polyurethanes so prepared exhibit exceptional light stability and age resistance.

The triamine (II), in addition to being an intermediate in the preparation of the triisocyanate (I), is also useful as a curative for various polymers. For example, said triamine can be employed in the curing of epoxy resins using procedures well-known in the art; see, for example, Oleesky et al., Handbook of Reinforced Plastics, pages 71–80, Reinhold Publishing Corporation, New York, 1964.

The novel triamine (II) is also useful as an intermediate in the preparation of polyols and can be reacted with alkylene oxides, for example, ethylene oxide, propylene oxide, 1,2-butylene oxide, and the like, to form the corresponding adducts which are useful as polyols in the preparation of polyurethane foams. The methods employed in the reaction of the alkylene oxide with the triamine are those known in the art, such as are described in British specification 1,042,220. The amount of alkylene oxide employed can vary from about 2 to 20 moles per amine group. When more than 2 moles of alkylene oxide per amine group are employed, it is necessary to use potassium hydroxide as catalyst for the alkoxylation.

DETAILED DESCRIPTION OF THE INVENTION

The triisocyanate (I) of the invention is prepared conveniently by phosgenation of the corresponding triamine (II) using phosgenation procedures well-known in the art. The phosgenation is carried out advantageously using the procedures described by Siefken, Annalen, 562, 75 et seq., 1949. Illustratively, the free triamine (II) or an acid addition salt thereof such as the trihydrochloride, trihydrobromide, and the like, is treated with phosgene in the presence of an inert organic solvent such as benzene, toluene, xylene, naphthalene, Decalin, chlorobenzene, o-dichlorobenzene, bromobenzene, o-chlorotoluene, and the like. The reaction is conducted advantageously at elevated temperatures and preferably at temperatures of the order of 150° C. to 200° C. The phosgene is conveniently employed in approximately stoichiometric proportions but an excess of phosgene can be employed if desired. The desired triisocyanate (I) is isolated from the reaction mixture by conventional procedures. For example, the excess phosgene is purged from the reaction mixture using nitrogen or other inert gas and the inert solvent is removed by distillation under reduced pressure. The residual triisocyanate (I) can be purified, if desired, by conventional procedures, for example, by solvent extraction using solvents such as petroleum ether, pentane, hexane, heptane, and the like, which selectively extract the triisocyanate from the insoluble phosgenation by-products. The triisocyanate is recovered from the solvent extract by evaporation of the latter to dryness, advantageously after first treating the solvent extract with activated charcoal.

The novel triamine (II) which is employed as intermediate in the above process, is itself prepared advantageously by hydrogenation of the corresponding trinitrile (III). Said hydrogenation can be carried out by any of the procedures known in the art for the reduction of a nitrile to the corresponding amine; see, for example, Chemistry of Carbon Compounds, Ed. by E. H. Rodd, volume III A, page 488, Elsevier, New York, 1954. Such methods include reduction using sodium in the presence of a lower alkanol such as methanol, ethanol, and the like, and the use of Raney nickel advantageously in the presence of a lower alkanol as hereinbefore exemplified. The triamine (II) so obtained can be purified, if desired, by conventional procedures such as by conversion to a solid acid addition salt and recrystallization of the latter. The formation of the acid addition salts, which latter form part of this invention, can be accomplished by procedures well-known in the art. For example, the triamine (II) can be dissolved in at least the stoichiometric amount of an aqueous solution of the appropriate acid and the salt can be isolated by evaporation of the solution. Alternatively, the triamine (II) in solution in an organic solvent such as methanol, ethanol, ethyl acetate, ether, and the like, can be treated with at least an equivalent amount of the appropriate acid; according to the nature of the solvent employed, the desired salt will separate spontaneously or can be precipitated by the addition of a solvent in which the salt is insoluble. The acid addition salt of the triamine (II) can be formed from any organic or inorganic acid. Examples of such acids are sulfuric, hydrochloric, hydrobromic, phosphoric, nitric, phosphomolybdic, acetic, propionic, fumaric, maleic, p-toluene-sulfonic, benzoic, tartaric, succinic, oxalic, cyclohexylsulfamic acids, and the like.

The trinitrile (III) which is employed as starting material for the preparation of the triamine (II) is conveniently prepared by reaction of the known $\alpha,\alpha'$-dihalo-p-xylene, preferably the $\alpha,\alpha'$-dichloro- or $\alpha,\alpha'$-dibromo derivative, with excess sodium cyanide in the presence of an organic solvent preferably a highly polar, aprotic solvent such as dimethylacetamide, dimethylsulfoxide, diethylsulfoxide, acetonitrile, dioxane, tetrahydrofuran, the monomethyl ether of ethyleneglycol, tetramethylurea, and the like. The reaction is preferably carried out at elevated temperatures such as about 50° C. to about 150° C. The amount of sodium cyanide employed is advantageously in excess of stoichiometric proportions, i.e. is greater than 2 moles per mole of the dihaloxylene. Preferably the amount of sodium cyanide employed is of the order of 4 moles of sodium cyanide per mole of dihaloxylene. The reaction product so obtained is a mixture of the desired trinitrile (III) and $\alpha,\alpha'$-dicyano-p-xylene.

If desired, said mixture can be used as such, without any further treatment, in the production of the corresponding triamine (II) using the procedures described above. Alternatively, said mixture can be separated into its components by conventional procedures such as chromatography, fractional distillation, fractional crystallization, and the like to yield the desired trinitrile (III) in substantially pure form.

The following examples describe the manner and process of making and using the invention and set forth the best mode contemplated by the inventor of carrying out the invention but are not to be construed as limiting.

EXAMPLE 1

*1,2-di(4-cyanomethylphenyl)-1-cyanoethane*

A slurry of 103 g. (2.1 mole) of sodium cyanide in 150 g. of dimethyl formamide was heated to 100° C. to 110° C. with agitation and to the slurry was added slowly with high speed stirring a solution of 78 g. (0.5 mole) of $\alpha,\alpha'$-dichloro-p-xylene in 100 g. of dimethylformamide. The reaction mixture was cooled, when necessary, to maintain the temperature within the above range. After the addition was complete the reaction mixture was maintained at the above temperature until a total of eight hours had elapsed from the time at which the reaction was initiated. The resulting mixture was filtered hot and the insoluble material was washed on the filter with hot dimethylformamide. The filtrate and washings were combined and evaporated to dryness. This residue (94.2 g.) was dissolved in 200 ml. of chloroform and the solution was washed successively with 200 ml. of dilute hydrochloric acid and 100 ml. of water. The washed chloroform solution was evaporated to dryness and the residue (78.2 g.) was distilled under reduced pressure. The distillate was 52.6 g. of $\alpha,\alpha'$-dicyano-p-xylene having a boiling point of 152° C. to 160° C. at 0.2 mm. of mercury. The undistilled residue (20.6 g.) was dissolved in benzene, the benzene solution was decanted from a small quantity of black tar (0.3 g.), and the decanted solution was evaporated to dryness. The residue was recrystallized three times from methanol and twice from ethanol to yield 5.6 g. of 1,2-di(4-cyanophenyl)-1-cyanoethane in the form of a white crystalline solid having a melting point of 124° C. to 128° C. NMR and infrared spectroscopic analysis confirmed the assigned structure of this material.

EXAMPLE 2

*1,2-di[4-(2-aminoethyl)phenyl]-3-aminopropane and the trihydrochloride thereof*

A mixture of 95 g. (0.33 mole) of 1,2-di(4-cyanophenyl)-1-cyanoethane (prepared as described in Example 1) in 400 ml. of methanol containing 80 g. of dissolved ammonia was charged to a stirred stainless steel autoclave. A suspension of 8 g. of Raney nickel was added and the resulting mixture was hydrogenated using an initial pressure of hydrogen of 200 p.s.i. The autoclave was heated at about 100° C. to 110° C. until uptake of hydrogen ceased. At that time the contents of the autoclave were cooled to room temperature (circa 25° C.), removed from the autoclave, and filtered. The filtrate was evaporated to dryness and the residue was recrystallized from aqueous alcohol. There was thus obtained 1,2-di[4-(2-aminoethyl)phenyl]-3-aminopropane in the form of a crystalline solid.

A solution of 1 g. of the triamine (prepared as described) in 50 ml. of anhydrous ether is treated with a slight excess of ethereal hydrogen chloride. The precipitate which separates is isolated by filtration and washed with ether. There is thus obtained 1,2-di[4-(2-aminoethyl)phenyl]-3-aminopropane trihydrochloride in the form of a crystalline solid.

Other acid addition salts of the above triamine are prepared by neutralizing the triamine with an aqueous of alcoholic solution of the appropriate acid and evaporating the resulting solution to dryness.

EXAMPLE 3

*1,2-di[4-(2-isocyanatoethyl)phenyl]-3-isocyanatopropane*

A solution of 297 g. (1 mole) of 1,2-di[4-(2-aminoethyl)phenyl]-3-aminopropane (prepared as described in Example 2) in 500 ml. of chlorobenzene was added slowly with stirring to a previously prepared solution of 450 g. of phosgene in 2300 g. of chlorobenzene maintained at 15° C. throughout the addition. When the addition was complete the reaction mixtures was heated at 115° C. to 130° C. while a slow stream of phosgene was passed therethrough over a period of about 12 hours. The resulting solution was purged with nitrogen to remove excess phosgene and the chlorobenzene was removed from the purged solution by distillation under reduced pressure. There was thus obtained 1,2-di[4-(2-isocyanatoethyl)phenyl]-3-isocyanatopropane in the form of a solid.

EXAMPLE 4

This example illustrates the use of the triamine (II) of the invention as an intermediate in the formation of polyols.

A total of 348 g. (6 moles) of propylene oxide was passed slowly, over a period of five hours, into 297 g. (1 mole) of 1,2-di[4-(2-aminoethyl)phenyl]-3-aminopropane maintained molten at 170° C. under nitrogen. A small amount of propylene oxide which passed out of the reaction mixture was collected in a cold trap and returned to the reaction mixture. When the addition of propylene oxide was complete the reaction mixture was cooled to room temperature. There was obtained the polyol adduct of 6 moles of propylene oxide and 1 mole of 1,2-di[4-(2-aminoethyl)phenyl]-3-aminopropane in the form of a brown viscous liquid having a hydroxyl number of 520 and a viscosity of 100,000 cps. at 25° C.

Using the above procedure, but replacing propylene oxide by ethylene oxide or butylene oxide, there are obtained the corresponding adducts. Similarly, by using the above procedure but adding 1 percent by weight of potassium hydroxide to the reaction mixture and increasing the proportion of propylene oxide, it is possible to obtain adducts containing up to about 20 moles of propylene oxide per amino group.

A polyol was also prepared from a crude form of the triamine (II) of the invention using the following procedure. A 12 liter reactor was charged with 1010 g. of NaCN, 3500 mls. of the monomethyl ether of ethylene glycol and 25 ml. of distilled water. The slurry was heated with agitation to 120° C. At this point a solution of 1750 g. of α,α'-dichloro-p-xylene in 1000 mls. of monomethyl ether of ethylene glycol was added over a forty minute period. The reaction was continued at 124° C. for an additional 30 minutes. The sodium chloride which separated was removed by filtration and the filtrate was carbon treated. After evaporation of the solvent a residue (1602 g.), which contained 87.3% of 1,2-di(4-cyanophenyl)-1-cyanoethane, was obtained.

A five-gallon high pressure autoclave was charged with 1453 g. of this residue, 8 liters of methanol, 2892 g. of anhydrous ammonia and 290 g. of Raney nickel. The autoclave was purged with nitrogen and pressured to 125 p.s.i.g. with hydrogen. The autoclave was heated to 100° C. and hydrogenation was continued at 350–500 p.s.i.g. until the reaction stopped (three hours), i.e. no further uptake of hydrogen occurred. The autoclave was cooled and vented. The contents were removed, filtered, and the filtrate was evaporated under reduced pressure to remove ammonia and methanol. The residue was distilled at 130° C. and 0.5 mm. pressure to remove a total of 1069 g. of diamine. The distillation bottoms (380 g.) consisted mainly of the triamine and was analyzed as follows: amine equivalent 138.7; primary amine content 0.0060 milliequivalents/g.; secondary amine content 0.000; tertiary amine content 0.0009 milliequivalents/g.

The above impure triamine (370 g.), was reacted with 265 g. of propylene oxide at 170° C. to 185° C. A viscous dark resin resulted which had an hydroxyl equivalent weight of 129.9, and a viscosity of 80,000 cps. at 25° C. This material was found to be very suitable for the production of fine celled, rigid, polyurethane foam.

What is claimed:
1. 1,2-di[4-(2-aminoethyl)phenyl] - 3 - aminopropane having the formula:

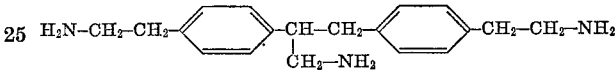

References Cited
UNITED STATES PATENTS
3,539,611   11/1970   Farrissey et al. ___ 260—570.5 X ROBERT V. HINES, Primary Examiner U.S. Cl. X.R.

260—2 N, 2.5 AT, 47 EN, 775. N, 453 AR, 465 H, 501.1, 501.12, 501.21